US012596746B2

(12) United States Patent
Liu et al.

(10) Patent No.: US 12,596,746 B2
(45) Date of Patent: Apr. 7, 2026

(54) AUDIO PREVIEWING METHOD, APPARATUS AND STORAGE MEDIUM

(71) Applicant: BEIJING ZITIAO NETWORK TECHNOLOGY CO., LTD., Beijing (CN)

(72) Inventors: Chaopeng Liu, Beijing (CN); Feng Cai, Beijing (CN); Yan Yu, Beijing (CN); Liang Ren, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 104 days.

(21) Appl. No.: 17/600,603

(22) PCT Filed: Jul. 2, 2021

(86) PCT No.: PCT/CN2021/104205
§ 371 (c)(1),
(2) Date: Oct. 1, 2021

(87) PCT Pub. No.: WO2022/052603
PCT Pub. Date: Mar. 17, 2022

(65) Prior Publication Data
US 2022/0318302 A1     Oct. 6, 2022

(30) Foreign Application Priority Data

Sep. 11, 2020     (CN) .......................... 202010955529.4

(51) Int. Cl.
*G06F 16/64*        (2019.01)
*G06F 3/16*         (2006.01)
(Continued)

(52) U.S. Cl.
CPC .............. *G06F 16/64* (2019.01); *G06F 3/165* (2013.01); *G06F 16/61* (2019.01); *G06F 16/686* (2019.01)

(58) Field of Classification Search
None
See application file for complete search history.

(56) References Cited

U.S. PATENT DOCUMENTS 6,965,863  B1     11/2005   Zuberec
9,087,061  B2     7/2015    Robbin et al.
(Continued)

FOREIGN PATENT DOCUMENTS

CN        101828184  A      9/2010
CN        103400593  A      11/2013
(Continued)

OTHER PUBLICATIONS

Notification to Grant Patent Right for Invention issued 202010955529.4 in Chinese Patent Application No. Jan. 30, 2022.
(Continued)

*Primary Examiner* — Mandrita Brahmachari

(57)              ABSTRACT

The present application provides an audio previewing method, an apparatus and a storage medium. The method plays, on a target audio file set interface, an audio preview clip of at least one audio file in a target audio file set in response to a previewing request of previewing the target audio file set without entering a target audio file set detailed interface, so that a user can quickly preview the target audio file set through auditory sense, and the user can preview the at least one audio file in the target audio file set at a time, which is simple in operation. In addition, embodiments of the present application further display, on the target audio file set interface, information of an audio file corresponding
(Continued)

Button for playing an entire target audio file

Good Life
Singer A

Returning sensing area to the audio preview clip that is currently played during previewing, such as name and/or singer.

17 Claims, 9 Drawing Sheets

(51) Int. Cl.
G06F 16/61 (2019.01)
G06F 16/68 (2019.01)

(56) References Cited

U.S. PATENT DOCUMENTS

| | | | | |
|---|---|---|---|---|
| 2002/0147728 A1* | 10/2002 | Goodman | ........... | G06F 16/4387 |
| 2007/0061497 A1 | 3/2007 | Takatsuka | | |
| 2007/0244986 A1* | 10/2007 | Svendsen | ................ | H04L 67/06 |
| | | | | 709/217 |
| 2008/0077264 A1* | 3/2008 | Irvin | ........................ | G06F 16/68 |
| | | | | 707/E17.102 |
| 2011/0234480 A1* | 9/2011 | Fino | ..................... | G11B 27/105 |
| | | | | 345/156 |
| 2011/0252322 A1* | 10/2011 | Roberts | ................. | G06F 3/0219 |
| | | | | 715/716 |
| 2012/0079430 A1* | 3/2012 | Kwahk | ................. | G06F 3/0488 |
| | | | | 715/834 |
| 2012/0260293 A1* | 10/2012 | Young | ..................... | G06F 3/017 |
| | | | | 725/52 |
| 2013/0167029 A1* | 6/2013 | Friesen | ................. | G06F 3/0482 |
| | | | | 715/716 |
| 2017/0150203 A1* | 5/2017 | Li | ......................... | G06F 3/0488 |
| 2017/0357909 A1 | 12/2017 | Willamowski et al. | | |
| 2019/0012134 A1 | 1/2019 | Chang et al. | | |

FOREIGN PATENT DOCUMENTS

| | | |
|---|---|---|
| CN | 104750818 A | 7/2015 |
| CN | 105609121 A | 5/2016 |
| CN | 106528661 A | 3/2017 |
| CN | 107454465 A | 12/2017 |
| CN | 112035698 A | 12/2020 |
| WO | 2017140273 A1 | 8/2017 |

OTHER PUBLICATIONS

Who is there in Qianjiang, "Making ringtones without software," Computer Fan, Jul. 2020.
ISR of CNPCT2100583 dated Jul. 2, 2021, CNPCT2100583(P2008703401WO).
CN Office action, CN202010955529.4, dated Apr. 14, 2021; CNCNP202000545(P2008703401CN).
CN Office action, CN202010955529.4, dated Jul. 20, 2021; CNCNP202000545(P2008703401CN).
Extended EP Search Report mailed Apr. 28, 2023 in EP Appl. No. 21865659.3 (7 pages).
International Search Report for International Application No. PCT/CN2021/117199, mailed Dec. 17, 2021, 5 pages.
Written Opinion for International Application No. PCT/CN2021/104205, mailed Sep. 28, 2021, 11 Pages.
Oral Proceedings for European Application No. 21865659.3, mailed Nov. 19, 2024, 7 pages.

* cited by examiner

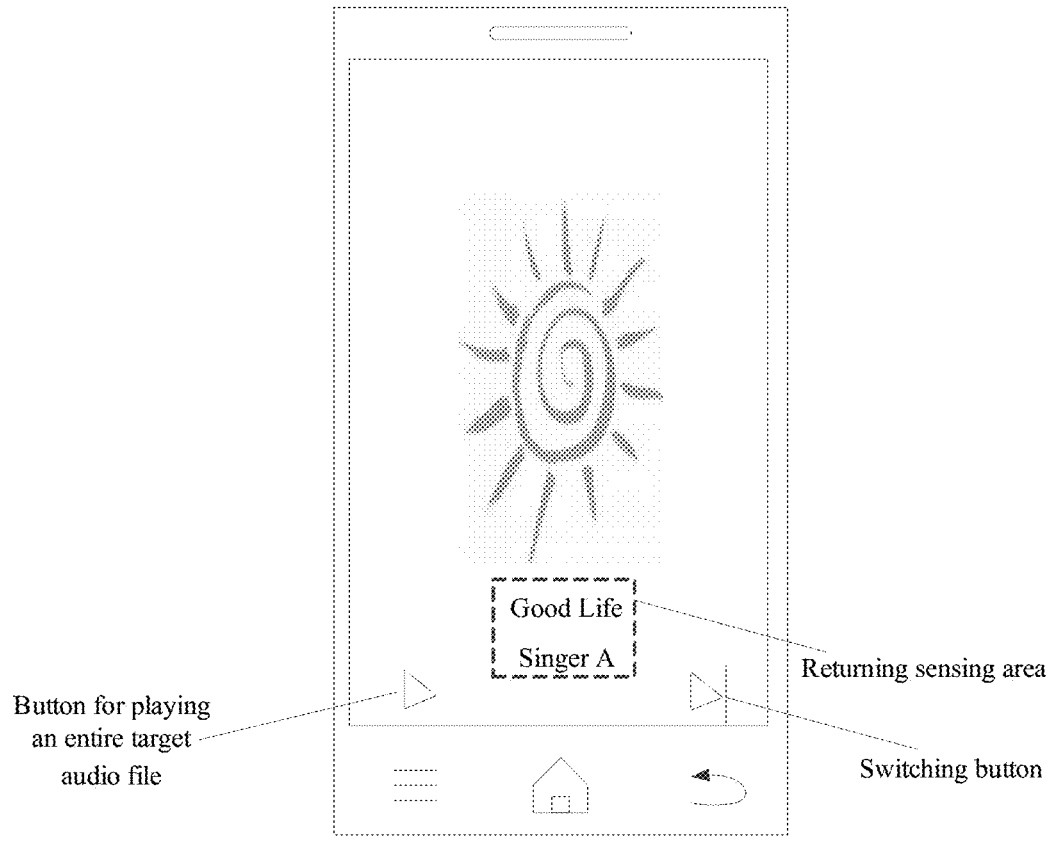

Good Life

Singer A

Returning sensing area

Button for playing
an entire target
audio file

Switching button

FIG. 7

Play, on the target audio file set interface, an audio preview clip
of at least one audio file in a target audio file set in response to a
previewing request of previewing the target audio file set

S801

The above target audio file set interface includes information of
each audio file in the at least one audio file; stress out and display, on
the target audio file set interface, the above information of the
audio file corresponding to the audio preview clip that is
currently played

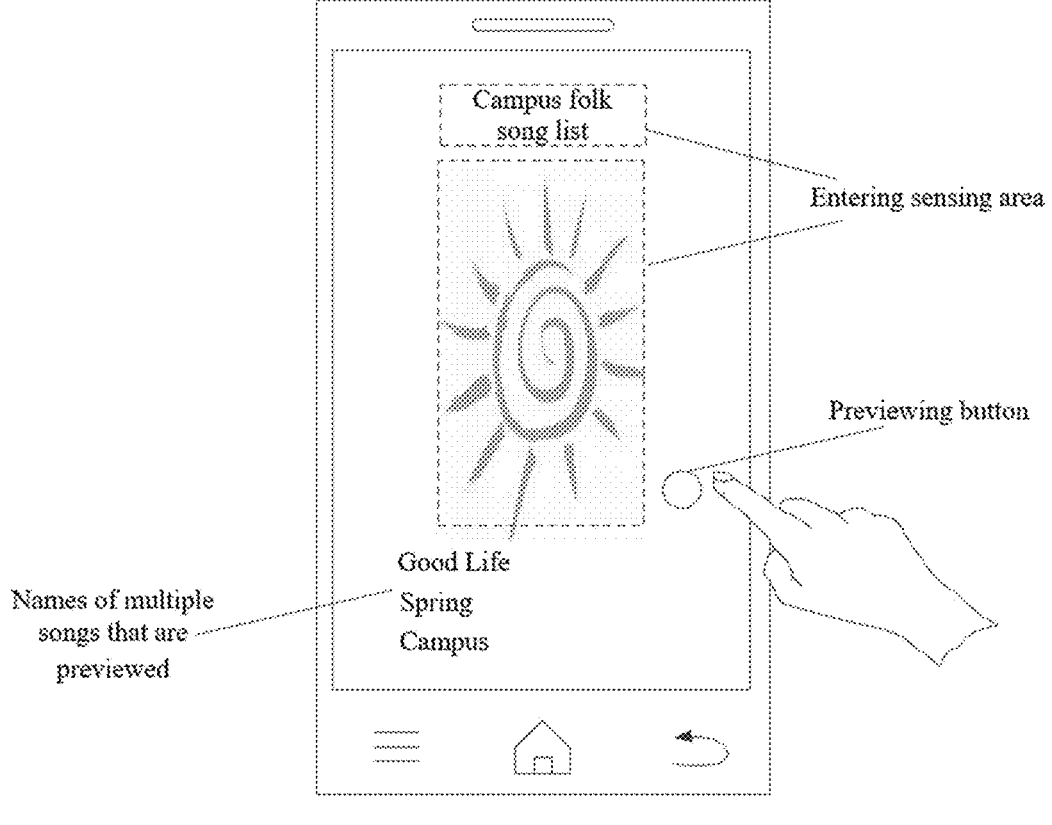

FIG. 9

Play, on a target audio file set interface, an audio preview clip of at least one audio file in a target audio file set in response to a previewing request of previewing the target audio file set ⌐ S1001

Display, on the target audio file set interface, information of an audio file corresponding to the audio preview clip that is currently played ⌐ S1002

Determine a progress bar corresponding to the above audio preview clip of the at least one audio file when playing the audio preview clip of the at least one audio file in the target audio file set, and display the progress bar on the target audio file set interface, where the progress bar represents a play progress of the audio preview clip of the at least one audio file ⌐ S1003

FIG. 10

AUDIO PREVIEWING METHOD, APPARATUS AND STORAGE MEDIUM

CROSS-REFERENCE TO RELATED APPLICATION

This application is a National Stage of International Application No. PCT/CN2021/104205, filed on Jul. 2, 2021, which claims priority to Chinese Patent Application No. 202010955529.4, filed to the China National Intellectual Property Administration on Sep. 11, 2020 and entitled "AUDIO PREVIEWING METHOD, APPARATUS AND STORAGE MEDIUM", the content. Both of which are hereby incorporated by reference in its entiretytheir entireties.

TECHNICAL FIELD

Embodiments of the present application relate to computer technologies, and in particular to an audio previewing method, an apparatus, and a storage medium.

BACKGROUND

Music can help people relieve fatigue and relax their minds. People generally install a music application on a terminal to play songs in a song list. The music application provides a music library for a user, so that the user can find audio file sets such as favorite song lists, albums therefrom.

In related technologies, the music application provides information such as cover images, title descriptions of multiple audio file sets on an audio file set list interface of the music library, for example, taking a song list as an example, the music application provides information such as cover images, title descriptions of multiple song lists on a song list interface of the music library, but the user often cannot determine whether a certain song list meets tastes based on the above information, so it is necessary to preview songs in the song list.

However, existing users find that when they preview songs in a song list, they need to click on an individual song to preview one by one after entering a song list detailed interface and seeing a song list, or preview on a song list interface, they could not acquire specific information (for example, information such as a song title, a singer) of a previewed song, and only one song can be previewed, and then it is impossible to confirm whether the song list is favorite thereof, which takes more time, is complicated in process, and is inconvenient for the users to operate.

SUMMARY

In order to solve the problems in the prior art, the present application provides an audio previewing method, an apparatus and a storage medium.

In a first aspect, an embodiment of the present application provides an audio previewing method, including:

playing, on a target audio file set interface, an audio preview clip of at least one audio file in a target audio file set in response to a previewing request of previewing the target audio file set; and displaying, on the target audio file set interface, information of an audio file corresponding to an audio preview clip that is currently played.

In a possible implementation, when playing the audio preview clip of the at least one audio file in the target audio file set, the method further includes:

switching, on the target audio file set interface, the audio preview clip that is currently played in response to a switching request of switching the audio preview clip that is currently played, and playing a switched audio preview clip.

In a possible implementation, the target audio file set interface includes the information of each audio file in the at least one audio file; and the displaying, on the target audio file set interface, information of the audio file corresponding to the audio preview clip that is currently played includes:

stressing out and displaying, on the target audio file set interface, the information of the audio file corresponding to the audio preview clip that is currently played.

In a possible implementation, when playing, on the target audio file set interface, the audio preview clip of the at least one audio file in the target audio file set, the method further includes:

determining a progress bar corresponding to the audio preview clip of the at least one audio file; and displaying the progress bar on the target audio file set interface, where the progress bar represents a play progress of the audio preview clip of the at least one audio file.

In a possible implementation, the progress bar includes multiple segments, and each segment of the multiple segments corresponds to an audio preview clip of one audio file in the at least one audio file.

In a possible implementation, before playing, on the target audio file set interface, the audio preview clip of the at least one audio file in the target audio file set, the method further includes:

jumping to an audio file set detailed interface from the target audio file set interface in response to an entering request of entering the audio file set detailed interface of the target audio file set, where the audio file set detailed interface includes the information of each audio file in the target audio file set.

In a possible implementation, when playing, on the target audio file set interface, the audio preview clip of the at least one audio file in the target audio file set, the method further includes:

stopping playing, on the target audio file set interface, the audio preview clip of the at least one audio file in response to a playing request of playing each audio file in the target audio file set, and calling a player to play each audio file in the target audio file set.

In a possible implementation, when playing, on the target audio file set interface, the audio preview clip of the at least one audio file in the target audio file set, the method further includes:

stopping playing, on the target audio file set interface, the audio preview clip of the at least one audio file in response to a returning request of returning to a state before previewing the target audio file set, and displaying, on the target audio file set interface, an interface state before previewing the target audio file set.

In a possible implementation, after playing, on the target audio file set interface, the audio preview clip of the at least one audio file in the target audio file set, the method further includes:

storing, on the target audio file set interface, the target audio file set in a preset unit in response to a collecting request of collecting the target audio file set after completing previewing.

In a possible implementation, after playing, on the target audio file set interface, the audio preview clip of the at least one audio file in the target audio file set, the method further includes:

jumping to an audio file set detailed interface from the target audio file set interface in response to an entering request of entering the audio file set detailed interface of the target audio file set after completing previewing, where the audio file set detailed interface includes the information of each audio file in the target audio file set.

In a possible implementation, after playing, on the target audio file set interface, the audio preview clip of the at least one audio file in the target audio file set, the method further includes:

displaying, on the target audio file set interface, an interface state before previewing the target audio file set in response to a returning request of returning to a state before previewing the target audio file set after completing previewing.

In a possible implementation, after playing, on the target audio file set interface, the audio preview clip of the at least one audio file in the target audio file set, the method further includes:

calling, on the target audio file set interface, a player to play each audio file in the target audio file set in response to a playing request of playing each audio file in the target audio file set after completing previewing.

In a possible implementation, after playing, on the target audio file set interface, the audio preview clip of the at least one audio file in the target audio file set, the method further includes:

replaying, on the target audio file set interface, the audio preview clip of the at least one audio file in response to a retrying request of repreviewing the target audio file set after completing previewing.

In a possible implementation, the information includes at least one of name and singer.

In a possible implementation, the switching, on the target audio file set interface, the audio preview clip that is currently played includes:

switching, on the target audio file set interface, to an audio preview clip of a next audio file of the audio file corresponding to the audio preview clip that is currently played according to a play sequence of the at least one audio file.

In a possible implementation, before playing, on the target audio file set interface, the audio preview clip of the at least one audio file in the target audio file set, the method further includes:

determining the audio preview clip of the at least one audio file in the target audio file set, where the audio preview clip of the at least one audio file is a characteristic audio clip in the at least one audio file.

In a second aspect, an embodiment of the present application provides an audio previewing apparatus, including:

a previewing module, is configured to play, on a target audio file set interface, an audio preview clip of at least one audio file in a target audio file set in response to a previewing request of previewing the target audio file set; and a displaying module, configured to display, on the target audio file set interface, information of an audio file corresponding to an audio preview clip that is currently played.

In a possible implementation, the above-mentioned apparatus further includes a switching module, configured to, when the previewing module plays the audio preview clip of the at least one audio file in the target audio file set, switch, on the target audio file set interface, the audio preview clip that is currently played in response to a switching request of switching the audio preview clip that is currently played, and play a switched audio preview clip.

In a possible implementation, the target audio file set interface includes the information of each audio file in the at least one audio file; and the displaying module is specifically configured to:

stress out and display, on the target audio file set interface, the information of the audio file corresponding to the audio preview clip that is currently played.

In a possible implementation, the previewing module is further configured to:

determine a progress bar corresponding to the audio preview clip of the at least one audio file; and display the progress bar on the target audio file set interface, where the progress bar represents a play progress of the audio preview clip of the at least one audio file.

In a possible implementation, the progress bar includes multiple segments, and each segment of the multiple segments corresponds to an audio preview clip of one audio file in the at least one audio file.

In a possible implementation, the previewing module is further configured to:

jump to an audio file set detailed interface from the target audio file set interface in response to an entering request of entering the audio file set detailed interface of the target audio file set, where the audio file set detailed interface includes the information of each audio file in the target audio file set.

In a possible implementation, the previewing module is further configured to:

stop playing, on the target audio file set interface, the audio preview clip of the at least one audio file in response to a playing request of playing each audio file in the target audio file set, and call a player to play each audio file in the target audio file set.

In a possible implementation, the previewing module is further configured to:

stop playing, on the target audio file set interface, the audio preview clip of the at least one audio file in response to a returning request of returning to a state before previewing the target audio file set, and display, on the target audio file set interface, an interface state before previewing the target audio file set.

In a possible implementation, the previewing module is further configured to:

store, on the target audio file set interface, the target audio file set in a preset unit in response to a collecting request of collecting the target audio file set after completing previewing.

In a possible implementation, the previewing module is further configured to:

jump to an audio file set detailed interface from the target audio file set interface in response to an entering request of entering the audio file set detailed interface of the target audio file set after completing previewing, where the audio file set detailed interface includes the information of each audio file in the target audio file set.

In a possible implementation, the previewing module is further configured to:

display, on the target audio file set interface, an interface state before previewing the target audio file set in response to a returning request of returning to a state before previewing the target audio file set after completing previewing.

In a possible implementation, the previewing module is further configured to:

call, on the target audio file set interface, a player to play each audio file in the target audio file set one audio file in response to a playing request of playing each audio file in the target audio file set after completing previewing.

In a possible implementation, the previewing module is further configured to:

replay, on the target audio file set interface, the audio preview clip of the at least one audio file in response to a retrying request of repreviewing the target audio file set after completing previewing.

In a possible implementation, the information includes at least one of name and singer.

In a possible implementation, the switching module is specifically configured to:

switch, on the target audio file set interface, to an audio preview clip of a next audio file of the audio file corresponding to the audio preview clip that is currently played according to a play sequence of the at least one audio file.

In a possible implementation, the previewing module is further configured to:

determine the audio preview clip of the at least one audio file in the target audio file set, where the audio preview clip of the at least one audio file is a characteristic audio clip in the at least one audio file.

In a third aspect, an embodiment of the present application provides an audio previewing device, including:

a processor;

a memory; and a computer program;

where the computer program is stored in the memory and is configured to be executed by the processor, and the computer program includes instructions for executing the method according to the first aspect.

In a fourth aspect, an embodiment of the present application provides a computer-readable storage medium, the computer-readable storage medium stores a computer program, and the computer program enables a server to execute the method according to the first aspect.

In a fifth aspect, the present application provides a computer program product including computer program instructions, where the computer program instructions enable a computer to execute the method according to the first aspect.

In a sixth aspect, the present application provides a computer program, where the computer program enables a computer to execute the method according to the first aspect.

The embodiments of the present application provide the audio previewing method, the apparatus and the storage medium, the method plays, on the target audio file set interface, the audio preview clip of the at least one audio file in the target audio file set in response to the previewing request of previewing the target audio file set without entering a target audio file set detailed interface, so that a user can quickly preview the target audio file set through auditory sense, and the user can preview at least one audio file in the target audio file set at a time, which is simple in operation. In addition, the embodiments of the present application further display, on the target audio file set interface, the information of the audio file corresponding to the audio preview clip that is currently played during previewing, such as name and/or singer, thereby the user can acquire specific information of the audio file in time when previewing on the target audio file set interface, and then quickly confirm whether the above target audio file set is favorite thereof, which takes less time, is simple in process, and is convenient for the user to operate.

BRIEF DESCRIPTION OF DRAWINGS

In order to more clearly illustrate the technical solutions in the embodiments of the present application or in the prior art, the drawings needed to be used in the description of the embodiments or the prior art will be briefly described below. Obviously, the drawings in the following description are only some embodiments of the present application, for those of ordinary skill in the art, other drawings can be obtained according to these drawings without any creative efforts.

FIG. 7 is a schematic diagram of another target audio file set interface during previewing provided by an embodiment of the present application;

FIG. 8 is a schematic flowchart of another audio previewing method provided by an embodiment of the present application;

FIG. 9 is a schematic diagram of still another target audio file set interface before previewing provided by an embodiment of the present application;

FIG. 10 is a schematic flowchart of yet another audio previewing method provided by an embodiment of this application;

DESCRIPTION OF EMBODIMENTS

The technical solutions in the embodiments of the present application will be clearly and completely described below in combination with the drawings in the embodiments of the present application. Obviously, the described embodiments are part of the embodiments of the present application, but not all of the embodiments. Based on the embodiments of the present application, all other embodiments obtained by those of ordinary skill in the art without creative efforts are within the protection scope of the present application.

The terms "first", "second", "third" and "fourth" and the like (if exist) in the description and claims, and the above-mentioned drawings of the embodiments of the present application are used to distinguish similar objects, and are not necessarily used to describe a specific order or sequence. It should be understood that data used in this way can be interchanged under appropriate circumstances, so that the embodiments of the present application described herein can be implemented in a sequence other than those illustrated or described herein. In addition, the terms "include" and "have" and any variations thereof are intended to cover non-exclusive inclusions. For example, processes, methods, systems, products, or devices that include a series of steps or units are not necessarily limited to clearly list those steps or units, but may include other steps or units that are not clearly listed or are inherent to these processes, methods, products, or devices.

Audio previewing related in the embodiments of the present application refers to preview, on a target audio file set interface, an audio preview clip of at least one audio file in a target audio file set, meanwhile display, on the target audio file set interface, information of an audio file corresponding to an audio preview clip that is currently played during previewing, such as name and/or singer, so that on the one hand, a user can quickly preview the target audio file set through auditory sense, and on the other hand, the user can acquire specific information of the audio file in time when previewing on the target audio file set interface, and then quickly confirm whether the target audio file set is favorite thereof.

An audio previewing method provided by an embodiment of the present application may be applied to a preview scenario of an audio file set, for example, a preview scenario of a song list or a preview scenario of an album, or the like, which is not particularly limited in the embodiments of the present application.

Figure 1:
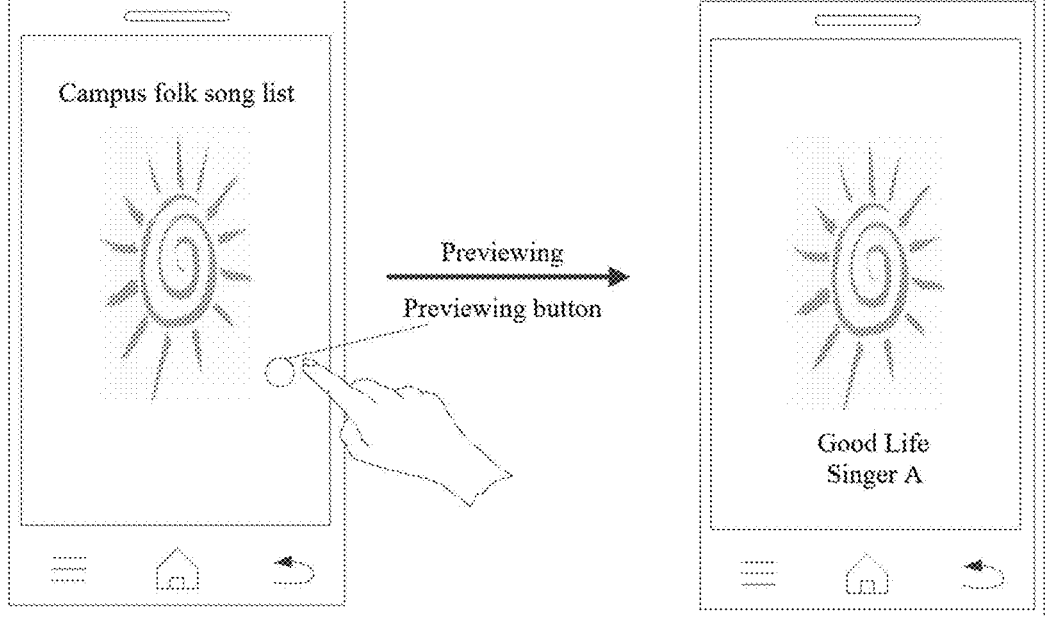
FIG. 1 is a schematic diagram of a possible application scenario of an audio previewing method provided by an embodiment of the present application.

In an implementation, the audio previewing method provided by the embodiments of the present application may be applied to an application scenario shown in FIG. 1. FIG. 1 only describes a possible application scenario of the audio previewing method provided by the embodiments of the present application by way of an example, and the application scenario of the audio previewing method provided by the embodiments of the present application is not limited to the application scenario shown in FIG. 1.

FIG. 1 is a schematic diagram of a possible application scenario of the audio previewing method. In FIG. 1, the preview scenario of the song list is taken as an example, where the above song list includes multiple songs, and specific songs may be determined according to actual situations. For example, the above song list is campus folk, and the song list includes multiple campus folk songs, or, the above song list is rock, and the song list includes multiple rock songs, or the like, which is not particularly limited in the embodiments of the present application.

Exemplarily, user 1 using a user terminal to preview a song list is taken as an example. Here, the user terminal may install a music application (Application, APP) that implements functions such as previewing song lists, playing songs. The user 1 may preview the song list through the APP on the user terminal to find a song list that is favorite thereof.

In a specific preview process, the user 1 may open a certain song list interface through the above APP on the user terminal, such as a campus folk song list in FIG. 1, and preview audio preview clips of multiple songs in the song list on the song list interface. That is, the above user terminal responds to a request of the user to preview the song list through the above APP, for example, a previewing button is provided on a campus folk song list interface as shown in FIG. 1, and the above request may be generated by the user clicking the above previewing button. And then, the above user terminal plays, on the campus folk song list interface, the audio preview clips of the multiple songs in the above song list according to the above request, meanwhile displays, on the above song list interface, information of a song corresponding to an audio preview clip that is currently played during playing, such as name and/or singer. For example, as shown in FIG. 1, a name Good Life and a singer A of a song corresponding to the audio preview clip that is currently played are displayed on the campus folk song list interface, so that the user can quickly preview the song list through auditory sense, and acquire specific information of previewing songs in time when previewing on the song list interface, and then quickly confirm whether the song list is favorite thereof.

In this embodiments, the above user terminal may be devices such as a handheld device, a vehicle-mounted device, a wearable device, a computing device, and various forms of user equipment (UE), where the devices may install music APPs that can implement functions such as previewing song lists, playing songs, and the like.

The audio previewing method provided by the embodiments of the present application will be introduced in detail below in combination with the drawings. An execution subject of the method may be the user terminal in FIG. 1. A workflow of the user terminal mainly includes previewing and displaying. The user terminal may play, on the target audio file set interface, the audio preview clip of the at least one audio file in the target audio file set in response to a previewing request of the target audio file set through an installed music App that implements functions such as previewing song lists and playing songs, meanwhile display, on the target audio file set interface, the information of the audio file corresponding to the audio preview clip that is currently played, such as name and/or singer, so that the user quickly confirms whether the target audio file set is favorite thereof, which takes less time, is simple in process, and is convenient for the user to operate.

The technical solutions of the present application are described below by taking several embodiments as examples, and the same or similar concepts or processes may not be repeated in some embodiments.

Figure 2:
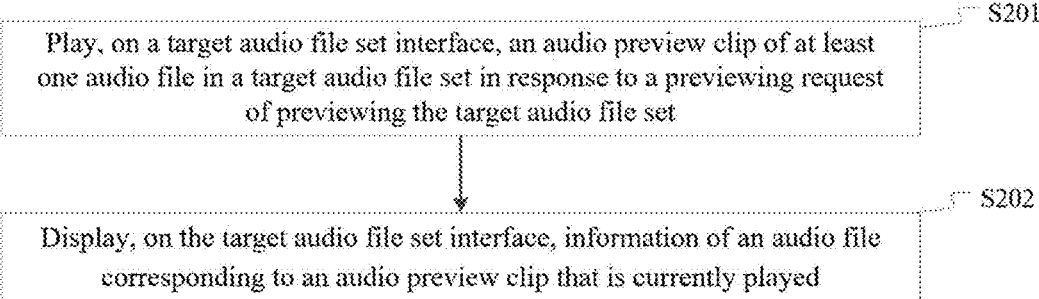
FIG. 2 is a schematic flowchart of an audio previewing method provided by an embodiment of the present application.

FIG. 2 is a schematic flowchart of an audio previewing method provided by an embodiment of the present application, an execution subject of this embodiment may be the user terminal in FIG. 1, a specific execution subject may be determined according to actual application scenarios, which is not particularly limited in the embodiments of the present application. As shown in FIG. 2, the audio previewing method provided by the embodiments of the present application may include the following steps:

S201: playing, on a target audio file set interface, an audio preview clip of at least one audio file in a target audio file set in response to a previewing request of previewing the target audio file set.

Here, the target audio file set may be determined according to actual situations, such as a song list or an album. A target audio file set includes at least one audio file. For example, taking that the target audio file set is a song list as an example, the song list includes multiple songs. Where the at least one audio file included in the target audio file set may be determined according to actual situations, for example, the campus folk song list in FIG. 1 includes at least one campus folk song.

In some feasible embodiments, the above previewing request of previewing the target audio file set may be acquired in the following manners:

acquiring the previewing request of previewing the target audio file set through a previewing button provided on the target audio file set interface. For example, as shown in FIG. 1, when the user needs to preview the above target audio file set, the previewing button on the target audio file set interface is clicked, and then, the user terminal acquires the previewing request of the user to preview the target audio file set through the previewing button. Where information such as a shape and a position of the above previewing button may be determined according to actual situations. For example, the previewing button in FIG. 1 is a circle, and is on a lower right side of the target audio file set interface, which is not particularly limited in the embodiments of the present application. In addition, the above target audio file set interface may also be provided with a previewing sensing area. When the user needs to preview the above target audio file set, the above previewing sensing area may be clicked, in this way, the user terminal may acquire the previewing request of the user to preview the target audio file set through the above previewing sensing area. Where information such as a size and a position of the above previewing sensing area may be determined according to actual situations, which is not particularly limited in the embodiments of the present application.

In the embodiments of the present application, before playing, on the target audio file set interface, the audio preview clip of the at least one audio file in the target audio file set, the method further includes:

determining the audio preview clip of the above at least one audio file in the target audio file set, where the audio preview clip of the above at least one audio file is a characteristic audio clip in the above at least one audio file, for example, taking that the target audio file set is a song list as an example, the above characteristic audio clip may be understood as a chorus part of a song in the song list, or a clip with a higher degree of recognition of a song, and the like.

The above at least one audio file in the target audio file set may be determined according to actual situations. For example, the above at least one audio file is at least one representative audio file in the above target audio file set, or the above at least one audio file is at least one audio file determined from the target audio file set by the user terminal based on historical preview audio information of the user, or the like.

Exemplarily, the above playing, on the target audio file set interface, the audio preview clip of the above at least one audio file in the target audio file set may include: playing, on the target audio file set interface, the audio preview clip of the at least one audio file in the target audio file set according to a playing sequence of the above at least one audio file. Where the playing sequence of the above at least one audio file may be preset, and may also be a playing sequence set by the user acquired after the user terminal displays the above at least one audio file on the target audio file set interface and generates a playing sequence setting prompt.

In addition, before playing, on the target audio file set interface, the audio preview clip of the at least one audio file in the target audio file set, the method further includes:

jumping to an audio file set detailed interface from the target audio file set interface in response to an entering request of entering the audio file set detailed interface of the target audio file set, where the audio file set detailed interface includes the information of each audio file in the target audio file set, such as name and/or singer.

Figure 3:
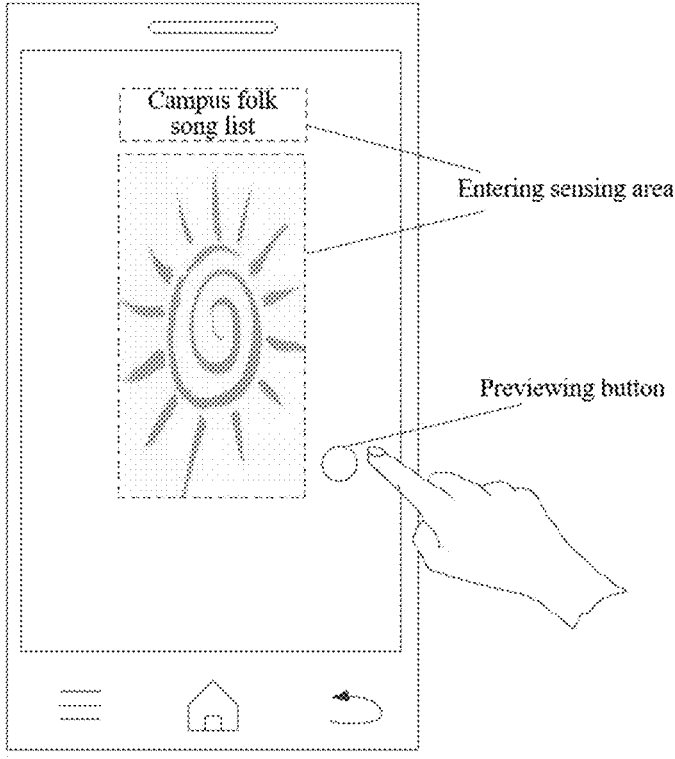
FIG. 3 is a schematic diagram of a target audio file set interface before previewing provided by an embodiment of the present application.

Here, the above target audio file set interface may further be provided with an entering button, so that the user terminal may acquire the entering request of entering the audio file set detailed interface of the target audio file set through the entering button, and then jump to the above audio file set detailed interface to enable the user to further know the information of each audio file in the target audio file set, and to confirm whether the above target audio file set is favorite thereof. Where information such as a shape and a position of the entering button may also be determined according to actual situations, which is not particularly limited in the embodiments of the present application. In addition, the above target audio file set interface may also be provided with an entering sensing area. When the user needs to enter the above audio file set detailed interface, the above entering sensing area may be clicked, in this way, the user terminal acquires the entering request of the user to enter the audio file set detailed interface of the target audio file set through the above entering sensing area. Where information such as a size and a position of the above entering sensing area may also be determined according to actual situations. For example, an area where a cover image and a title are located is the above entering sensing area, that is, an area where a cover image Little Sun and a title Campus Folk Song List are located in FIG. 3 is the above entering sensing area, which is not particularly limited in the embodiments of the present application.

S202: information of an audio file corresponding to an audio preview clip that is currently played is displayed on the target audio file set interface.

The information includes at least one of name and singer of the above audio file corresponding to the audio preview clip that is currently played.

Here, when playing the audio preview clip of the at least one audio file in the target audio file set according to the above previewing request, the user terminal displays, on the target audio file set interface, the information of the audio file corresponding to the audio preview clip that is currently played, such as name and/or singer, so that the user can acquire the specific information of the audio preview file in time when previewing on the target audio file set interface, and then quickly confirm whether the target audio file set is favorite thereof.

In some feasible embodiments, when playing the audio preview clip of the at least one audio file in the target audio file set, the method may further include:

stopping playing, on the target audio file set interface, the audio preview clip of the at least one audio file in response to a playing request of playing each audio file in the target audio file set, and calling a player to play each audio file in the target audio file set.

Here, when the above user terminal plays the audio preview clip of the at least one audio file in the target audio file set, if a request of playing the entire target audio file set is acquired on the target audio file set interface, that is, the above playing request of playing each audio file in the target audio file set, then stops previewing according to this request, and plays the entire target audio file set.

Figure 4:
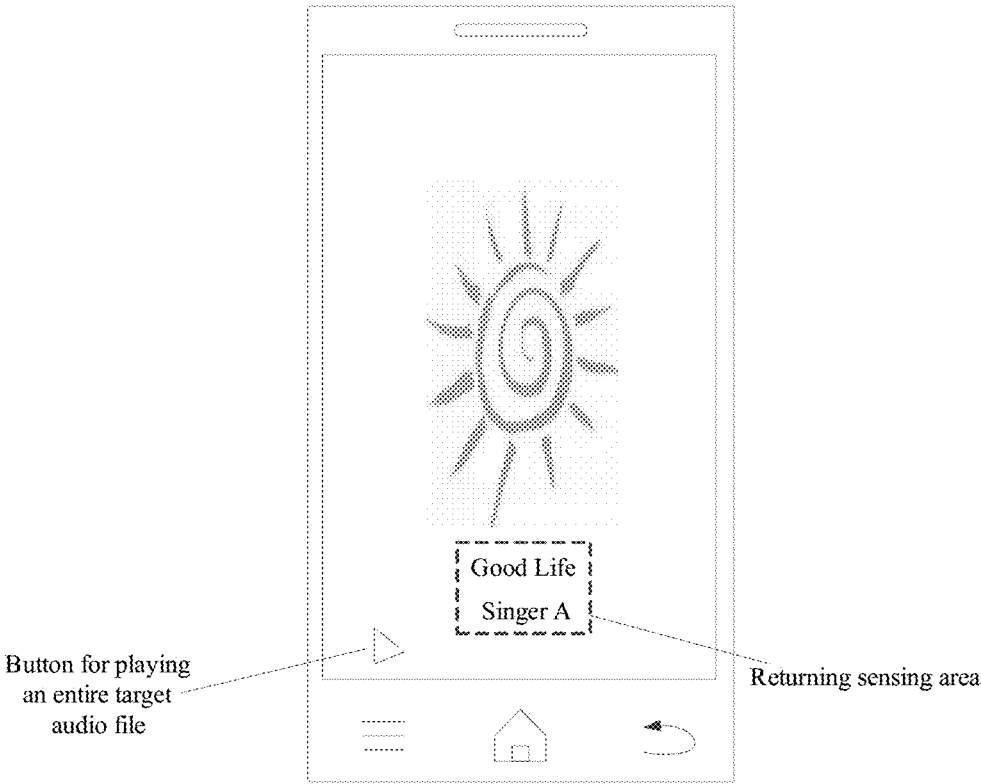
FIG. 4 is a schematic diagram of a target audio file set interface during previewing provided by an embodiment of the present application.

The above target audio file set interface may further be provided with a button for playing the entire target audio file set, so that the above user terminal may play the entire target audio file set through this button. Where information such as a shape and a position of the above button for playing the entire target audio file set may also be determined according to actual situations. For example, the above button in FIG. 4 is a triangle, and is on a lower left side of the target audio file set interface, which is not particularly limited in the embodiments of the present application. In addition, the above target audio file set interface may further be provided with a sensing area for playing the entire target audio file set. When the user needs to play the entire target audio file set, the above sensing area may be clicked, in this way, the user terminal acquires the playing request of the user to play the entire target audio file set through the above sensing area. Where information such as a size and a position of the above sensing area may also be determined according to actual situations, which is not particularly limited in the embodiments of the present application.

In an implementation, when playing the audio preview clip of the at least one audio file in the target audio file set, the method may further include:

> stopping playing, on the target audio file set interface, the audio preview clip of the at least one audio file in response to a returning request of returning to a state before previewing the target audio file set, and displaying, on the target audio file set interface, an interface state before previewing the target audio file set.

When the user terminal plays the audio preview clip of the at least one audio file in the target audio file set, if the returning request of returning to the state before previewing the target audio file set is acquired on the target audio file set interface, and then the user terminal stops previewing according to this request, and returns to the state before previewing, that is, displaying, on the target audio file set interface, the interface state before previewing the target audio file set.

The above target audio file set interface may further be provided with a returning button, so that the above user terminal may return to the state before previewing through this button. Where information such as a shape and a position of the above returning button may be determined according to actual situations, which is not particularly limited in the embodiments of the present application. In addition, the above target audio file set interface may further be provided with a returning sensing area. When the user needs to return to the state before previewing, the above sensing area may be clicked, in this way, the above user terminal acquires the returning request of the user to return to the state before previewing the target audio file set through the above sensing area. Where information such as a size and a position of the above sensing area may also be determined according to actual situations. For example, an area where an audio file name and a singer are located is the above returning sensing area, that is, an area where Good life and singer A are located in FIG. 4 is the above returning sensing area, which is not particularly limited in the embodiments of the present application.

In addition, after playing the audio preview clip of the at least one audio file in the target audio file set, the method may further include:

storing, on the target audio file set interface, the target audio file set in a preset unit in response to a collecting request of collecting the target audio file set after completing previewing.

The preset unit may be set according to actual situations, such as favorites. After completing previewing, if the user terminal acquires a request of collecting the target audio file set on the target audio file set interface, then collects the target audio file set according to this request, so that the user can quickly acquire the target audio file set in collected information later, which is simple and convenient.

Figure 5:
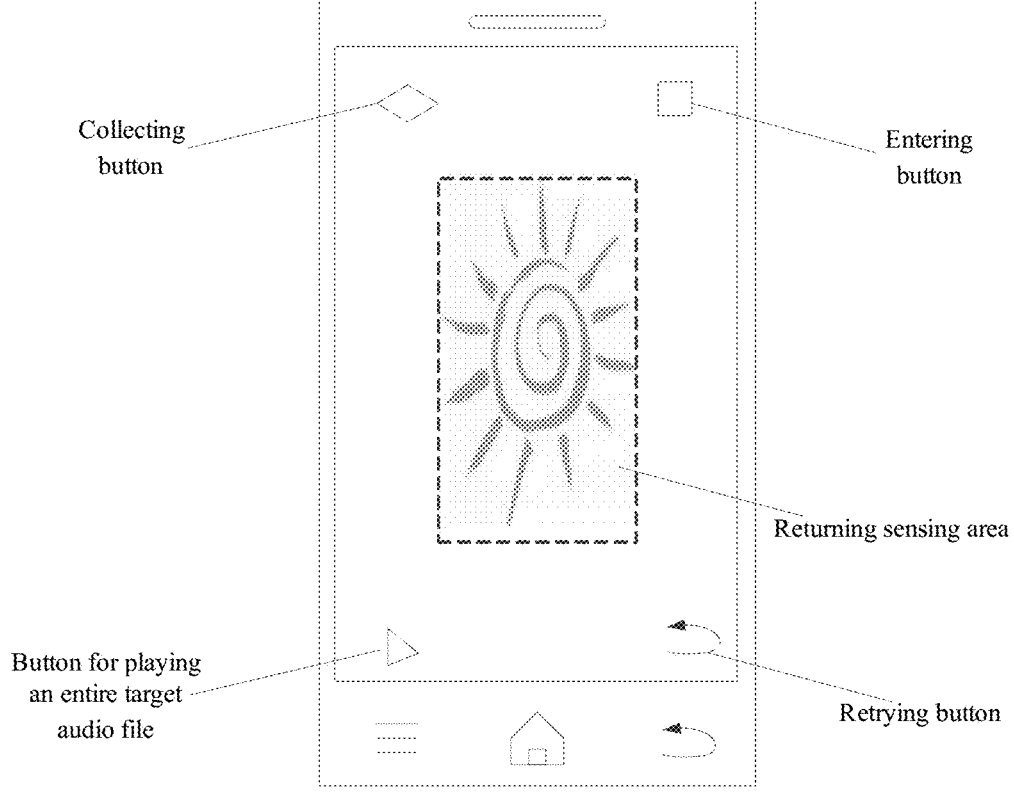
FIG. 5 is a schematic diagram of a target audio file set interface after previewing provided by an embodiment of the present application.

Here, the above target audio file set interface may further be provided with a collecting button, so that the above user terminal may acquire the collecting request of collecting the target audio file set through this button, and then collect the entire target audio file set. Where information such as a shape and a position of the above collecting button may also be determined according to actual situations. For example, the above button in FIG. 5 is a rhombus, and is on an upper left side of the target audio file set interface, which is not particularly limited in the embodiments of the present application. In addition, the above target audio file set interface may also be provided with a collecting sensing area. When the user needs to collect the entire target audio file set, the above sensing area may be clicked, in this way, the above user terminal acquires the collecting request of the user to collect the entire target audio file set through the above sensing area. Where information such as a size and a position of the above sensing area may also be determined according to actual situations, which is not particularly limited in the embodiments of the present application.

In an implementation, after playing the audio preview clip of the at least one audio file in the target audio file set, the method may further include:

> jumping to an audio file set detailed interface from the target audio file set interface in response to an entering request of entering the audio file set detailed interface of the target audio file set after completing previewing, where the audio file set detailed interface includes the information of each audio file in the target audio file set.

Here, information such as a shape and a position of the above entering button may also be determined according to actual situations. For example, the above button in FIG. 5 is a square, and is on an upper right side of the target audio file set interface, which is not particularly limited in the embodiments of the present application. In addition, the above target audio file set interface may also be provided with an entering sensing area. When the user needs to enter the above audio file set detailed interface, the above entering sensing area may be clicked, in this way, the user terminal acquires the entering request of the user to enter the audio file set detailed interface of the target audio file set through the above entering sensing area. Where information such as a size and a position of the above entering sensing area may also be determined according to actual situations.

In an implementation, after playing the audio preview clip of the at least one audio file in the target audio file set, the method may further include:

> displaying, on the target audio file set interface, an interface state before previewing the target audio file set in response to a returning request of returning to a state before previewing the target audio file set after completing previewing.

The above target audio file set interface may also be provided with a returning button, so that the user terminal may return to the state before previewing through this button. Where information such as a shape and a position of the above returning button may also be determined according to actual situations. For example, the button is a cross, which is not particularly limited in the embodiments of the present application. In addition, the above target audio file set interface may also be provided with a returning sensing area. When the user needs to return to the state before previewing, the above sensing area may be clicked, in this way, the user terminal acquires the returning request of the user to return to the state before previewing the target audio file set through the above sensing area. Where information such as a size and a position of the above sensing area may also be determined according to actual situations. For example, a certain blank area on the target audio file set interface is the above returning sensing area, that is, a blank area where a cover image Little Sun is located in FIG. 5 is the above returning sensing area, which is not particularly limited in the embodiments of the present application.

In an implementation, after playing the audio preview clip of the at least one audio file in the target audio file set, the method may further include:

calling, on the target audio file set interface, a player to play each audio file in the target audio file set in response to a playing request of playing each audio file in the target audio file set after completing previewing.

Here, the above target audio file set interface may also be provided with a button for playing the entire target audio file set, so that the user terminal may play the entire target audio file set through this button. Where information such as a shape and a position of the above button for playing the entire target audio file set may also be determined according to actual situations. For example, the above button in FIG. 5 is a triangle, and is on a lower left side of the target audio file set interface, which is not particularly limited in the embodiments of the present application. In addition, the above target audio file set interface may also be provided with a sensing area for playing the entire target audio file set. When the user needs to play the entire target audio file set, the above sensing area may be clicked, in this way, the above user terminal acquires the playing request of the user to play the entire target audio file set through the above sensing area. Where information such as a size and a position of the above sensing area may also be determined according to actual situations, which is not particularly limited in the embodiments of the present application.

In an implementation, after playing the audio preview clip of the at least one audio file in the target audio file set, the method may further include:

replaying, on the target audio file set interface, the audio preview clip of the at least one audio file in response to a retrying request of repreviewing the target audio file set after completing previewing.

After playing the audio preview clip of the at least one audio file in the target audio file set, if a request of repreviewing is acquired on the target audio file set interface after completing previewing, then the above user terminal replays the above audio preview clip of the at least one audio file according to this request, and repreviewing.

The above target audio file set interface may further be provided with a retrying button, so that the above user terminal may acquire the retrying request of repreviewing the target audio file set through this button, and then repreview the target audio file set. Where information such as a shape and a position of the above retrying button may also be determined according to actual situations. For example, the above button in FIG. 5 is a circular arrow, and is on a lower right side of the target audio file set interface, which is not particularly limited in the embodiments of the present application. In addition, the above target audio file set interface may also be provided with a retrying sensing area. When the user needs to repreview the target audio file set, the above sensing area may be clicked, in this way, the above user terminal may repreview the target audio file set through the above sensing area. Where information such as a size and a position of the above sensing area may also be determined according to actual situations, which is not particularly limited in the embodiments of the present application.

The embodiments of the present application play, on the target audio file set interface, the audio preview clip of the at least one audio file in the target audio file set in response to the previewing request of previewing the target audio file set without entering a target audio file set detailed interface, so that the user can quickly preview the target audio file set through auditory sense, and the user can preview the at least one audio file in the target audio file set at a time, which is simple in operation. In addition, the embodiments of the present application further display, on the target audio file set interface, the information of the audio file corresponding to the audio preview clip that is currently played during previewing, such as name and/or singer, thereby the user can acquire specific information of the audio file in time when previewing on the target audio file set interface, and then quickly confirm whether the above target audio file set is favorite thereof, which takes less time, is simple in process, and is convenient for the user to operate.

Moreover, the embodiments of the present application may jump to the audio file set detailed interface from the target audio file set interface in response to the entering request of entering the audio file set detailed interface of the target audio file set before the previewing. When previewing, the entire target audio file set is played on the target audio file set interface in response to the request of playing the entire target audio file set, or previewing is stopped on the target audio file set interface and the state before previewing is returned to in response to the returning request of returning to the state before previewing the target audio file set. After previewing, the target audio file set is collected on the target audio file set interface in response to the collecting request, or, is repreviewed on the target audio file set interface in response to the request of repreviewing, or the like, which satisfy various application requirements and being suitable for actual applications.

Figure 6:
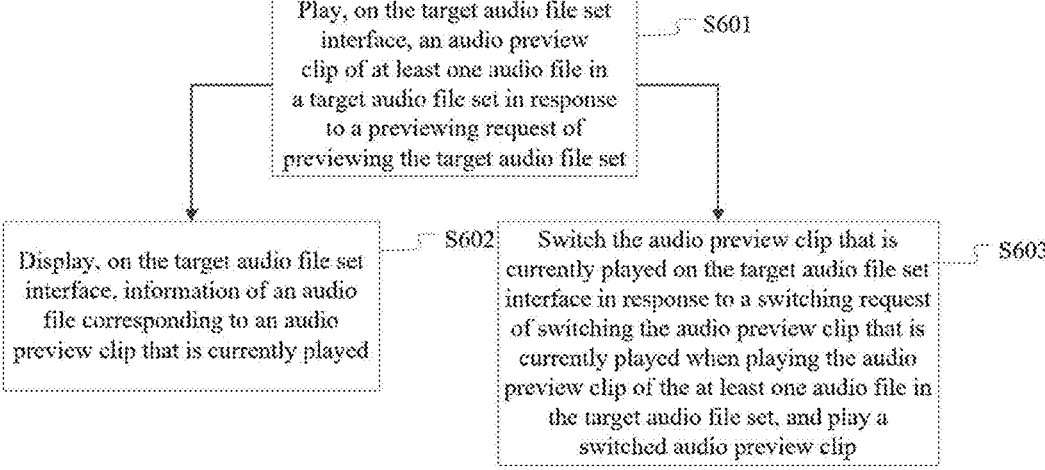
FIG. 6 is a schematic flowchart of another audio previewing method provided by an embodiment of the present application.

In addition, when playing the audio preview clip of the at least one audio file in the target audio file set, the embodiments of the present application further consider switching a previewed audio file on the target audio file set interface in response to a switching request of switching the audio preview clip that is currently played. FIG. 6 is a schematic flowchart of another audio previewing method provided by an embodiment of the present application. As shown in FIG. 6, the method includes:

S601: playing, on a target audio file set interface, an audio preview clip of at least one audio file in a target audio file set in response to a previewing request of previewing the target audio file set.

S602: information of an audio file corresponding to an audio preview clip that is currently played is displayed on the target audio file set interface.

Steps S601-S602 are implemented in a same way as the above steps S201-S202, which will not be repeated here.

S603: when playing the audio preview clip of the at least one audio file in the target audio file set, the audio preview clip that is currently played is switched on the target audio file set interface in response to the switching request of switching the audio preview clip that is currently played, and a switched audio preview clip is played.

Here, when previewing, the user terminal may switch the previewed audio file on the target audio file set interface in response to the switching request of switching the audio preview clip that is currently played. For example, an audio preview clip of a next audio file of the audio file corresponding to the above audio preview clip that is currently played is switched to according to a play sequence of the above at least one audio file, and a switched audio preview clip is played.

The above target audio file set interface may further be provided with a switching button, so that the above user terminal may acquire the switching request of switching the audio preview clip that is currently played through this button, and then switch the previewed audio file. Where information such as a shape and a position of the above switching button may also be determined according to actual situations. For example, the above button in FIG. 7 is a triangle with a vertical line, and is on a lower right side of the target audio file set interface, which is not particularly limited in the embodiments of the present application. In addition, the above target audio file collection interface may also be provided with a switching sensing area. When the user needs to switch the previewed audio file, the above sensing area may be clicked, in this way, the above user terminal may switch the previewed audio file through the above sensing area. Where information such as a size and a position of the above sensing area may also be determined according to actual situations, which is not particularly limited in the embodiments of the present application.

In addition, the above switching request may further carry corresponding information of the switched audio file, for example, an audio preview clip of a third previewed audio file is switched to; and the above switching the audio preview clip that is currently played may include: switching to a target audio file according to the above corresponding information of the switched audio file carried in the switching request, and playing the audio preview clip of the target audio file.

When previewing, the embodiments of the present application may switch the audio preview clip that is currently played on the target audio file set interface in response to the switching request of switching the audio preview clip that is currently played, and play the switched audio preview clip, which satisfies a requirement of the user to switch the previewed audio file when previewing the at least one audio file. And the embodiments of the present application play on the target audio file set interface, the audio preview clip of the at least one audio file in the target audio file set in response to the previewing request of previewing the target audio file set without entering the target audio file set detailed interface, so that the user can quickly preview the target audio file set through auditory sense, and the user can preview the at least one audio file in the target audio file set at a time, which is simple in operation. In addition, the embodiments of the present application further display, on the target audio file set interface, the information of the audio file corresponding to the audio preview clip that is currently played during previewing, such as name and/or singer, thereby the user can acquire specific information of the audio file in time when previewing on the target audio file set interface, and then quickly confirm whether the above target audio file set is favorite thereof, which takes less time, is simple in process, and is convenient for the user to operate.

In addition, the above target audio file set interface includes the information of each audio file in the above at least one audio file, such as name and/or singer, and then, when previewing, the embodiments of the present application display, on the target audio file set interface, the information of the audio file corresponding to the audio preview clip that is currently played, it is also considered to stress out and display, on the target audio file set interface, the information of the audio file corresponding to the audio preview clip that is currently played. FIG. 8 is a schematic flowchart of another audio previewing method provided by an embodiment of the present application. As shown in FIG. 8, the method includes:

S801: playing, on the target audio file set interface, an audio preview clip of at least one audio file in a target audio file set in response to a previewing request of previewing the target audio file set.

Step S801 is implemented in a same way as the step S201, which will not be repeated here.

S802: the above target audio file set interface includes the information of each audio file in the at least one audio file, and information of an audio file corresponding to an audio preview clip that is currently played is stressed out and displayed on the target audio file set interface.

Here, a manner of the above stressing out and displaying may be highlighting and displaying, and may be specifically set according to actual situations, which is not particularly limited in the embodiments of the present application.

In order to facilitate the user to understand the target audio file set, the above target audio file set interface may include the information of each previewed audio file in the above at least one audio file, that is, the above user terminal may display, on the above target audio file set interface, the information of each previewed audio file in the at least one audio file, such as name and/or singer. Exemplarily, as shown in FIG. 9, taking that the target audio file set is a campus folk song list as an example, multiple previewed songs of the campus folk song list are Good Life, Spring and Campus, and a campus folk song list interface includes names and/or singers of the above multiple previewed songs. FIG. 9 only takes that only the names of the previewed songs are included as an example.

When the above user terminal plays the audio preview clip of the at least one audio file in the target audio file set according to the above previewing request, in order to distinguish the audio preview clip that is currently played, the information of the audio file corresponding to the audio preview clip that is currently played may be stressed out and displayed, for example, highlighted and displayed, on the target audio file set interface, thereby the user can acquire specific information of the previewed audio file in time when previewing on the target audio file set interface, and then quickly confirm whether the above target audio file set is favorite thereof.

In addition, for other implementations of step S802 except the above implementation, references may be made to the above implementations of step S202, which will not be repeated here.

In the embodiments of the present application, the above target audio file set interface includes name and/or singer of each previewed audio file in the at least one audio file, which is convenient for the user to understand the target audio file set, and when previewing, the embodiments of the present application also consider to stress out and display, on the target audio file set interface, the above information of the audio file corresponding to the audio preview clip that is currently played, to remind the user the audio preview clip that is currently played, and then whether the target audio file set is favorite thereof is quickly confirmed. In addition, the embodiments of the present application play, on the target audio file set interface, the audio preview clip of the at least one audio file in the target audio file set in response to the previewing request of previewing the target audio file set without entering a target audio file set detailed interface, so that the user can quickly preview the target audio file set through auditory sense, and the user can preview the at least one audio file in the target audio file set at a time, which takes less time, is simple in process, and is convenient the user to operate.

In addition, before playing the audio preview clip of the at least one audio file in the target audio file set, the embodiments of the present application also considers determining a progress bar corresponding to the above audio preview clip of the at least one audio file, and then, displaying the above progress bar on the target audio file set interface when playing the target audio file of the audio preview clip of the at least one audio file. FIG. 10 is a schematic flowchart of another audio previewing method provided by an embodiment of the present application. As shown in FIG. 10, the method includes:

> S1001: playing, on the target audio file set interface, an audio preview clip of at least one audio file in a target audio file set in response to a previewing request of previewing the target audio file set.
> S1002: information of an audio file corresponding to an audio preview clip that is currently played is displayed on the target audio file set interface.
> Steps S1001-S1002 are implemented in a same way as the steps S201-S202, which will not be repeated here.
> S1003: when playing the audio preview clip of the at least one audio file in the target audio file set, the progress bar corresponding to the above audio preview clip of the at least one audio file is determined, and the above progress bar is displayed on the target audio file set interface, where the progress bar represents a play progress of the above audio preview clip of the at least one audio file.

Figure 11:
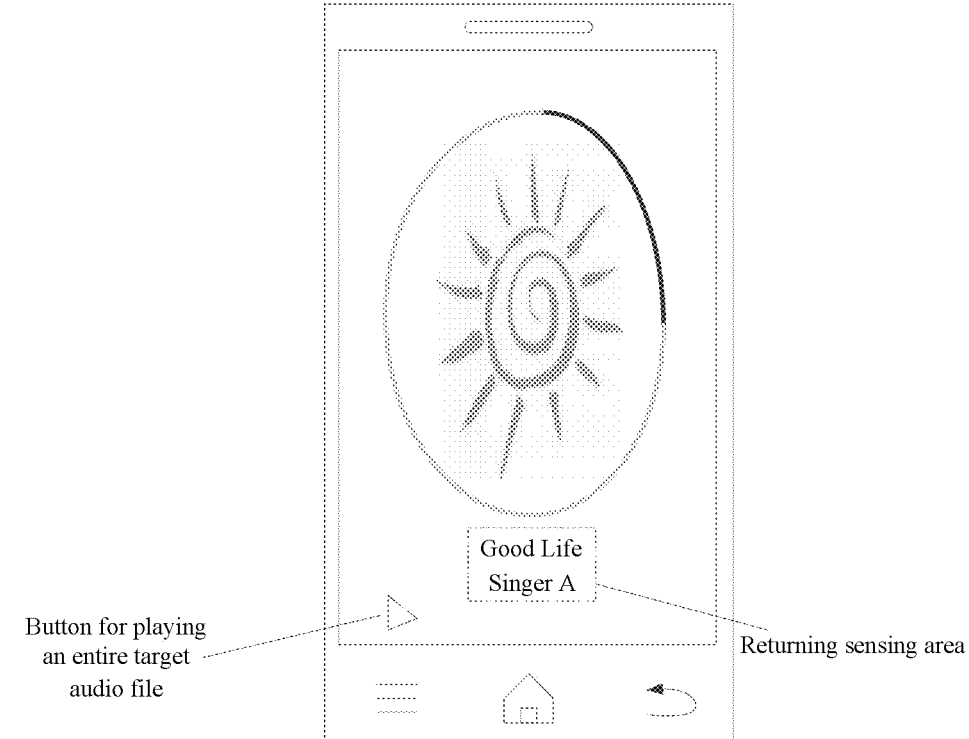
FIG. 11 is a schematic diagram of a progress bar provided by an embodiment of the present application.

Here, when previewing, the above user terminal may further determine the progress bar corresponding to the above audio preview clip of the at least one audio file, and the progress bar may be a total progress bar, for example, as shown in FIG. 11. When previewing, the above user terminal displays the progress bar on the target audio file set interface, and may display a preview progress on the above progress bar according to the play progress of the above audio preview clip of the at least one audio file, for example, a played progress is black, an unplayed progress is gray, which may be determined according to actual situations, which is convenient for the user to know the preview progress in time.

In some feasible embodiments, the above progress bar may include multiple segments, and each segment of the multiple segments corresponds to an audio preview clip of one audio file in the at least one audio file, respectively.

Figure 12:
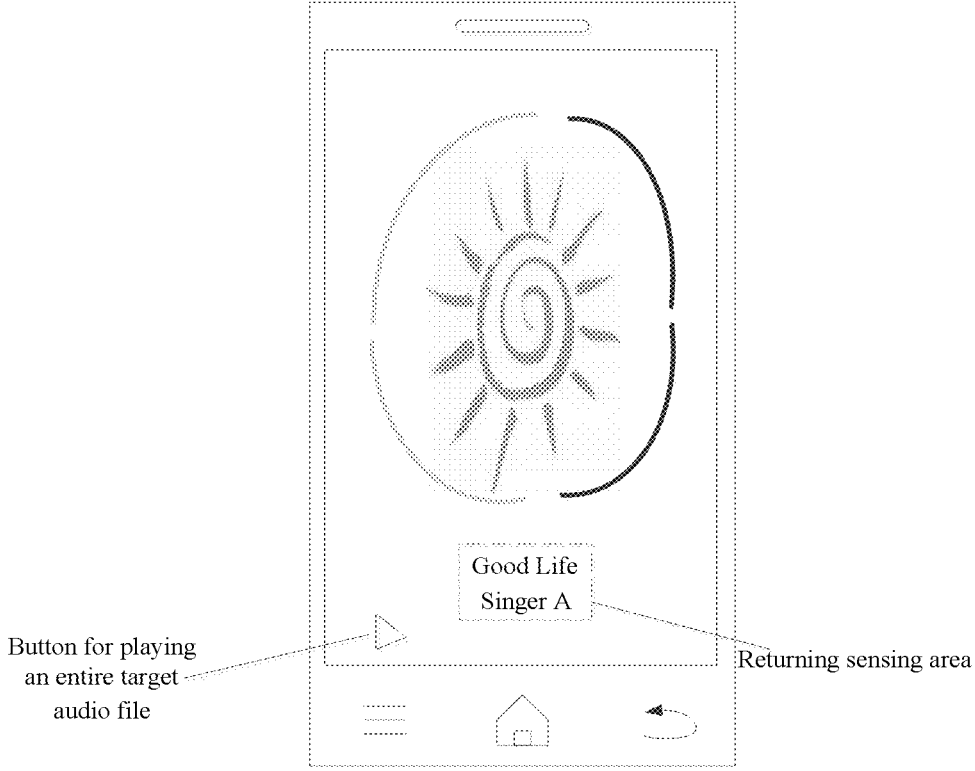
FIG. 12 is a schematic diagram of another progress bar provided by an embodiment of the present application.

Exemplarily, as shown in FIG. 12, taking that four audio files in the target audio file set are previewed as an example, a segment of progress bar corresponding to an audio preview clip of each audio file is displayed on the target audio file set interface, that is, a total of four segments of progress bar are displayed, and a preview progress is displayed on the segment of progress bar corresponding to the audio preview clip of each audio file according to the play progress of the audio preview clip of each audio file, for example, a played progress is black, an unplayed progress is gray, so that the user can know the preview progress more accurately, which is suitable for application.

Figure 13:
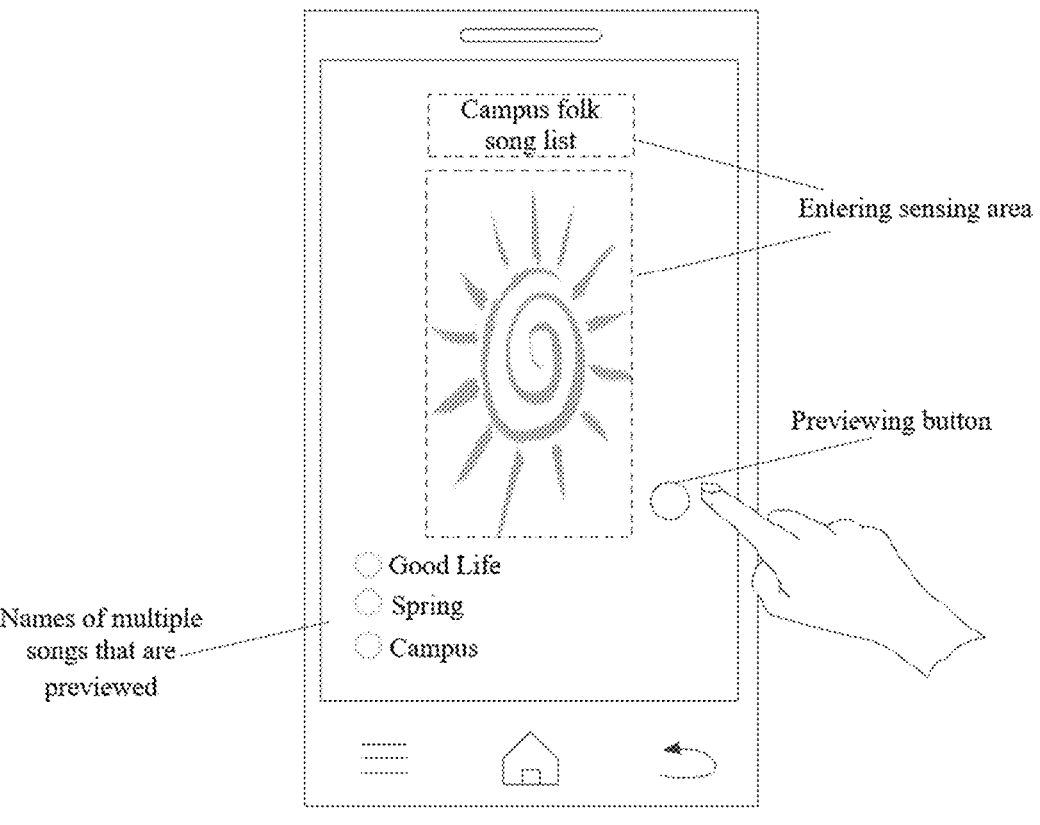
FIG. 13 is a schematic diagram of still another progress bar provided by an embodiment of the present application.

In addition, if the target audio file set interface includes the name and/or the singer of each audio file in the above at least one audio file, then an area of name and/or singer of each audio file is displayed on the target audio file set interface when playing the audio preview clip of the at least one audio file in the target audio file set, for example, as shown in FIG. 13. In front of a name of each audio file, a segment of progress bar corresponding to the audio preview clip of each audio file is displayed, and a preview progress is displayed on the segment of progress bar corresponding to the audio preview clip of each audio file according to a play progress of the audio preview clip of each audio file, for example, a played progress is black, and an unplayed progress is gray, and the like.

Before playing the audio preview clip of the at least one audio file in the target audio file set, the embodiments of the present application also consider determining a progress bar corresponding to the audio preview clip of the at least one audio file, and then displaying the above progress bar on the target audio file set interface when playing the audio preview clip of the at least one audio file in the target audio file set, where the progress bar represents the play progress of the above audio preview clip of the at least one audio file, so that the user can know the preview progress in time. Moreover, the embodiments of the present application play, on the target audio file set interface, the audio preview clip of the at least one audio file in the target audio file set in response to the previewing request of previewing the target audio file set without entering a target audio file set detailed interface, so that the user can quickly preview the target audio file set through auditory sense, and the user can preview the at least one audio file in the target audio file set at a time, which is simple in operation. In addition, the embodiments of the present application further display, on the target audio file set interface, the information of the audio file corresponding to the preview clip that is currently played during previewing, such as name and/or singer, thereby the user can acquire specific information of the audio file in time when previewing on the target audio file set interface, then quickly confirm whether the above target audio file set is favorite thereof, which takes less time, is simple in process, and is convenient for the user to operate.

Figure 14:
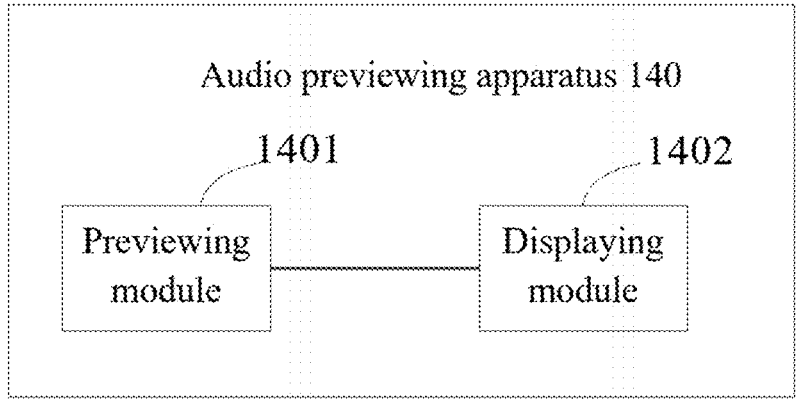
FIG. 14 is a schematic structural diagram of an audio previewing apparatus provided by an embodiment of the present application.

Corresponding to the audio previewing method of the above embodiments, FIG. 14 is a schematic structural diagram of an audio previewing apparatus provided by an embodiment of the present application. For sake of description, only parts related to the embodiments of the present application are shown. FIG. 14 is a schematic structural diagram of an audio previewing apparatus provided by an embodiment of the present application, the audio previewing apparatus 140 includes a previewing module 1401 and a displaying module 1402. The audio previewing apparatus here may be the above user terminal itself, or a chip or an integrated circuit that realizes functions of a user terminal. It needs to be illustrated here that a division of the previewing module and the displaying module is only a logical function division, and the two may be integrated or independent physically.

The previewing module 1401 is configured to play, on a target audio file set interface, an audio preview clip of at least one audio file in a target audio file set in response to a previewing request of previewing the target audio file set.

The displaying module 1402 is configured to display, on the target audio file set interface, information of an audio file corresponding to an audio preview clip that is currently played.

The apparatus provided in the embodiments of the present application may be used to implement the technical solutions of the foregoing method embodiments, and implementation principles and technical effects thereof are similar, which will not be repeated here by the embodiments of the present application.

Figure 15:
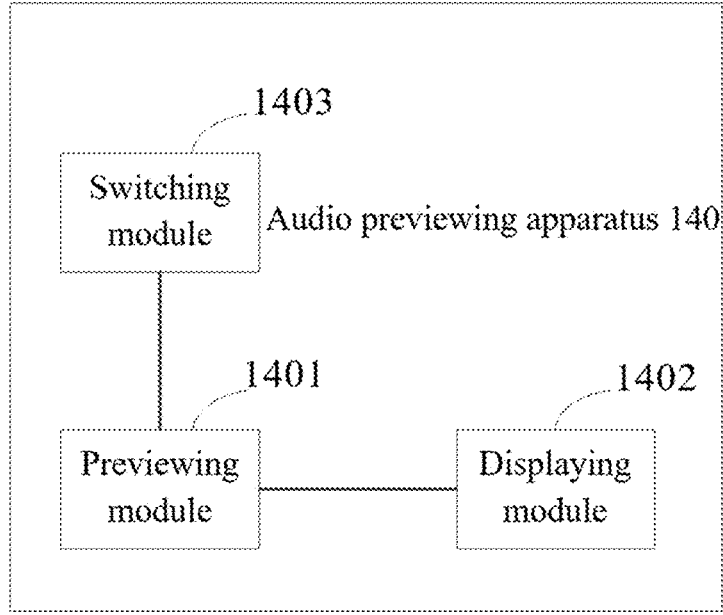
FIG. 15 is a schematic structural diagram of another audio previewing apparatus provided by an embodiment of the present application.

FIG. 15 is a schematic structural diagram of another audio previewing apparatus provided by an embodiment of the present application. On the base of FIG. 14, the audio previewing apparatus 140 further includes: a switching module 1403.

The switching module 1403 is configured to, when the previewing module plays the audio preview clip of the at least one audio file in the target audio file set, switch, on the target audio file set interface, the audio preview clip that is currently played in response to a switching request of switching the audio preview clip that is currently played, and play a switched audio preview clip.

In a possible implementation, the target audio file set interface includes the information of each audio file in the at least one audio file.

The displaying module 1402 is specifically configured to:

stress out and display, on the target audio file set interface, the information of the audio file corresponding to the audio preview clip that is currently played.

In a possible implementation, the previewing module 1401 is further configured to:

determine a progress bar corresponding to the audio preview clip of the at least one audio file; and display the progress bar on the target audio file set interface, where the progress bar represents a play progress of the audio preview clip of the at least one audio file.

In a possible implementation, the progress bar includes multiple segments, and each segment of the multiple segments corresponds to an audio preview clip of one audio file in the at least one audio file.

In a possible implementation, the previewing module 1401 is further configured to:

jump to an audio file set detailed interface from the target audio file set interface in response to an entering request of entering the audio file set detailed interface of the target audio file set, where the audio file set detailed interface includes the information of each audio file in the target audio file set.

In a possible implementation, the previewing module 1401 is further configured to:

stop playing, on the target audio file set interface, the audio preview clip of the at least one audio file in response to a playing request of playing each audio file in the target audio file set, and call a player to play each audio file in the target audio file set.

In a possible implementation, the previewing module 1401 is further configured to:

stop playing, on the target audio file set interface, the audio preview clip of the at least one audio file in response to a returning request of returning to a state before previewing the target audio file set, and display, on the target audio file set interface, an interface state before previewing the target audio file set.

In a possible implementation, the previewing module 1401 is further configured to:

store, on the target audio file set interface, the target audio file set in a preset unit in response to a collecting request of collecting the target audio file set after completing previewing.

In a possible implementation, the previewing module 1401 is further configured to:

jump to an audio file set detailed interface from the target audio file set interface in response to an entering request of entering the audio file set detailed interface of the target audio file set after completing previewing, where the audio file set detailed interface includes the information of each audio file in the target audio file set.

In a possible implementation, the previewing module 1401 is further configured to:

display, on the target audio file set interface, an interface state before previewing the target audio file set in response to a returning request of returning to a state before previewing the target audio file set after completing previewing.

In a possible implementation, the previewing module 1401 is further configured to:

call, on the target audio file set interface, a player to play each audio file in the target audio file set one audio file in response to a playing request of playing each audio file in the target audio file set after completing previewing.

In a possible implementation, the previewing module 1401 is further configured to:

replay, on the target audio file set interface, the audio preview clip of the at least one audio file in response to a retrying request of repreviewing the target audio file set after completing previewing.

In a possible implementation, the information includes at least one of name and singer.

In a possible implementation, the switching module 1403 is specifically configured to:

switch, on the target audio file set interface, to an audio preview clip of a next audio file of the audio file corresponding to the audio preview clip that is currently played according to a play sequence of the at least one audio file.

In a possible implementation, the previewing module 1401 is further configured to:

determine the audio preview clip of the at least one audio file in the target audio file set, where the audio preview clip of the at least one audio file is a characteristic audio clip in the at least one audio file.

The apparatus provided in the embodiments of the present application may be used to implement the technical solutions of the foregoing method embodiments, and implementation principles and technical effects are similar thereof, which will not be repeated here by the embodiments of the present application.

Figure 16A:
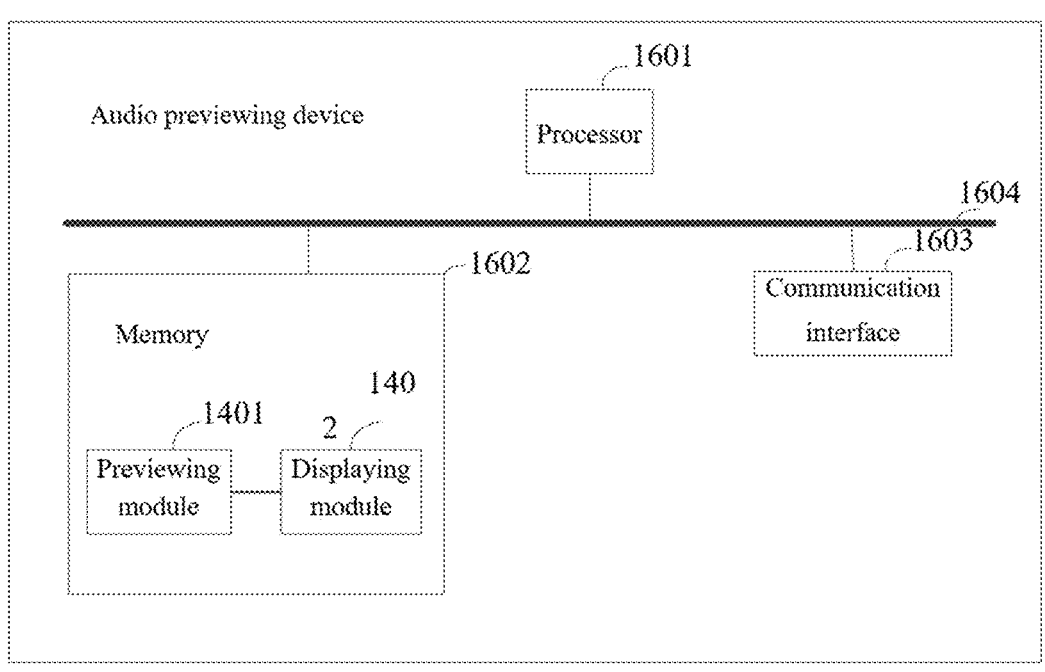
FIG. 16A is a schematic diagram of a basic hardware architecture of an audio previewing device provided by the present application.
Figure 16B:
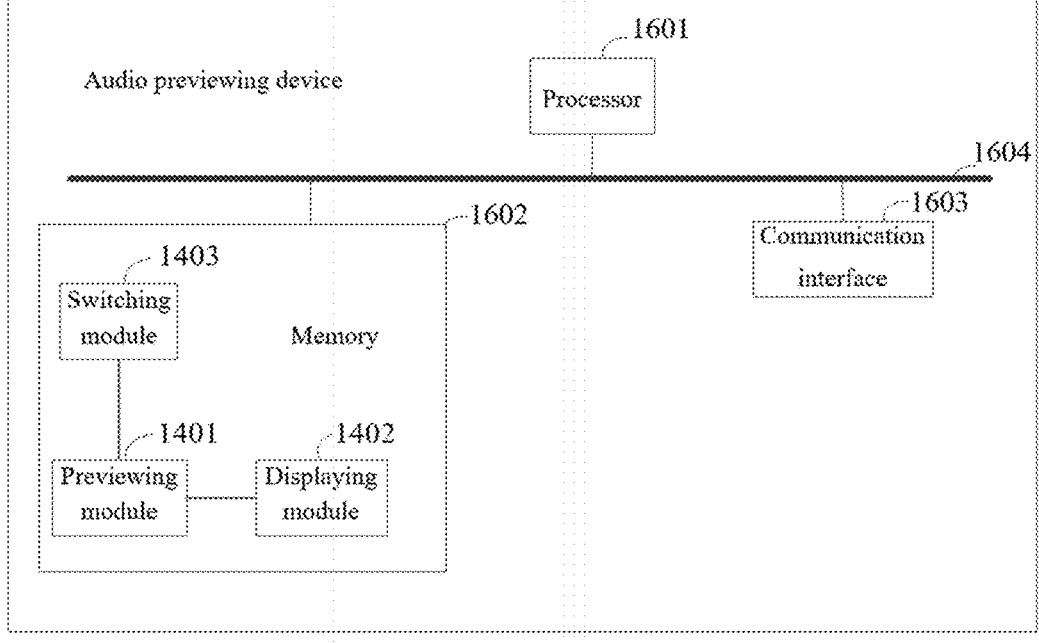
FIG. 16B is a schematic diagram of a basic hardware architecture of another audio previewing device provided by the present application.

In an implementation, FIG. 16A and FIG. 16B schematically respectively provide a possible basic hardware architecture of an audio previewing device described in the present application.

Referring to FIG. 16A and FIG. 16B, the audio previewing device may be the above user terminal, and includes at least one processor 1601 and a communication interface 1603. Further in an implementation, a memory 1602 and a bus 1604 may also be included.

In the audio previewing device, the number of the processor 1601 may be one or more, and FIG. 16A and FIG. 16B only show one of the processors 1601. In an implementation, the processor 1601 may be a central processing unit (CPU), a graphics processing unit (GPU), or a digital signal processor (DSP). If the audio previewing device has multiple processors 1601, types of the multiple processors 1601 may be different or may be the same. In an implementation, the multiple processors 1601 of the audio previewing device may also be integrated into a multi-core processor.

The memory 1602 stores computer instructions and data; and the memory 1602 may store computer instructions and data required to implement the audio previewing method provided by the present application. For example, the memory 1602 stores instructions of steps for implementing the above audio previewing method. The memory 1602 may be any one or any combination of the following storage media: non-volatile memory (for example, read only memory (ROM), solid state drive (SSD), hard disk drive (HDD), optical disk)), and volatile memory.

The communication interface 1603 may provide information input/output for the at least one processor. It may also include any one or any combination of the following devices: devices with a network access function such as a network interface (for example, an Ethernet interface), a wireless network card, and the like.

In an implementation, the communication interface 1603 may also be used for data communication between the audio previewing device and other computing devices or Further in an implementation, the bus 1604 is represented by a thick line in FIG. 16A and FIG. 16B. The bus 1604 may connect the processor 1601 with the memory 1602 and the communication interface 1603. Thus, the processor 1601 can access the memory 1602 through the bus 1604, and can also use the communication interface 1603 to perform data interaction with other computing devices or terminals.

In the present application, the audio previewing device executes the computer instructions in the memory 1602, so that the audio previewing device implements the above audio previewing method provided by the present application, or the audio previewing device deploys the above audio previewing apparatus.

From the perspective of logical function division, exemplarily, as shown in FIG. 16A, the memory 1602 may include the previewing module 1401 and the displaying module 1402. The inclusion here only relates that the instructions stored in the memory, when being executed, respectively implement functions of the previewing module and the displaying module, which are not limited to physical structures.

A possible design, as shown in FIG. 16B, the memory 1602 includes the previewing module 1401, the displaying module 1402, and the switching module 1403. The inclusion here only relates that the instructions stored in the memory, when being executed, respectively implement functions of the previewing module, the displaying module, and the switching module, which are not limited to physical structures.

In addition, the above audio previewing apparatus may be implemented by software as shown in FIG. 16A and FIG. 16B, and may also be implemented as a hardware module or as a circuit unit through hardware.

The present application provides a computer-readable storage medium. The computer program product includes computer instructions that indicate a computing device to execute the audio previewing method provided by the present application.

The present application provides a chip including at least one processor and a communication interface, and the communication interface provides information input and/or output for the at least one processor. Further, the chip may also include at least one memory, and the memory is configured to store computer instructions. The at least one processor is configured to call and run the computer instructions to execute the audio previewing method provided by the present application.

The present application provides a computer program product including computer program instructions, where the computer program instructions enable a computer to execute the above audio previewing method provided by the present application.

The present application provides a computer program, where the computer program enables a computer to execute the above audio previewing method provided by the present application.

In several embodiments provided by the present application, it should be understood that the disclosed apparatus and method may be implemented in other ways. For example, the apparatus embodiments described above are only illustrative. For example, the division of the unit is only a logical function division, and there may be other divisions ways in actual implementations, for example, multiple units or components may be combined or be integrated into another system, or some features may be ignored or not implemented. In addition, coupling or direct coupling or communication connection shown or discussed herein may be an indirect coupling or communication connection through some interfaces, apparatuses or units, and may be in electrical, mechanical or other forms.

The units described as separate components may or may not be physically separated, and the components displayed as units may or may not be physical units, that is, they may be located in one place, or may be distributed onto multiple network units. Some or all of the units may be selected according to actual needs for the purpose of implementing the solutions of the present embodiments.

In addition, each functional unit in the various embodiments of the present application may be integrated into one processing unit, or each unit may physically exist separately, or two or more units may be integrated into one unit. The above integrated units may be implemented in a form of hardware, or may be implemented in a form of hardware plus software functional units.

What is claimed is:

1. An audio previewing method, comprising:

playing, on a target audio file set interface, an audio preview clip of at least one audio file in a target audio file set in response to a previewing request of previewing the target audio file set, wherein the target audio file set interface is a previewing interface for previewing the target audio file set; and displaying, on the target audio file set interface, information of an audio file corresponding to an audio preview clip that is currently played;

wherein when playing, on the target audio file set interface, the audio preview clip of the at least one audio file in the target audio file set, the method further comprises:

determining a progress bar corresponding to the audio preview clip of the at least one audio file; and displaying the progress bar on the target audio file set interface, wherein the progress bar represents a play progress of the audio preview clip of the at least one audio file, wherein the progress bar comprises multiple segments, and each segment of the multiple segments corresponds to an audio preview clip of one audio file in the at least one audio file, and wherein a part of the progress bar which corresponds to a played part of the audio preview clip of the at least one audio file, and a part of the progress bar which corresponds to an unplayed part of the audio preview clip of the at least one audio file are displayed differently, wherein after playing, on the target audio file set interface, the audio preview clip of the at least one audio file in the target audio file set, the method further comprises:

switching to an audio file set detailed interface from the target audio file set interface in response to an entering request of entering the audio file set detailed interface of the target audio file set after completing previewing, wherein the audio file set detailed interface comprises the information of each audio file in the target audio file set, wherein the information comprises a name.

2. The method according to claim 1, wherein when playing the audio preview clip of the at least one audio file in the target audio file set, the method further comprises:

switching, on the target audio file set interface, the audio preview clip that is currently played in response to a switching request of switching the audio preview clip that is currently played, and playing a switched audio preview clip.

3. The method according to claim 2, wherein the switching, on the target audio file set interface, the audio preview clip that is currently played comprises:

switching, on the target audio file set interface, to an audio preview clip of a next audio file of the audio file corresponding to the audio preview clip that is currently played according to a playing sequence of the at least one audio file.

4. The method according to claim 1, wherein the target audio file set interface comprises the information of each audio file in the at least one audio file; and the displaying, on the target audio file set interface, information of the audio file corresponding to the audio preview clip that is currently played comprises:

highlighting and displaying, on the target audio file set interface, the information of the audio file corresponding to the audio preview clip that is currently played.

5. The method according to claim 1, wherein before playing, on the target audio file set interface, the audio preview clip of the at least one audio file in the target audio file set, the method further comprises:

jumping to an audio file set detailed interface from the target audio file set interface in response to an entering request of entering the audio file set detailed interface of the target audio file set, wherein the audio file set detailed interface comprises the information of each audio file in the target audio file set.

6. The method according to claim 1, wherein when playing, on the target audio file set interface, the audio preview clip of the at least one audio file in the target audio file set, the method further comprises:

stopping playing, on the target audio file set interface, the audio preview clip of the at least one audio file in response to a playing request of playing the target audio file set, and calling a player to play each audio file in the target audio file set.

7. The method according to claim 1, wherein when playing, on the target audio file set interface, the audio preview clip of the at least one audio file in the target audio file set, the method further comprises:

stopping playing, on the target audio file set interface, the audio preview clip of the at least one audio file in response to a returning request of returning to a state before previewing the target audio file set, and displaying, on the target audio file set interface, an interface state before previewing the target audio file set.

8. The method according to claim 1, wherein after playing, on the target audio file set interface, the audio preview clip of the at least one audio file in the target audio file set, the method further comprises:

storing, on the target audio file set interface, the target audio file set in a preset unit in response to a collecting request of collecting the target audio file set after completing previewing.

9. The method according to claim 1, wherein after playing, on the target audio file set interface, the audio preview clip of the at least one audio file in the target audio file set, the method further comprises:

displaying, on the target audio file set interface, an interface state before previewing the target audio file set in response to a returning request of returning to a state before previewing the target audio file set after completing previewing.

10. The method according to claim 1, wherein after playing, on the target audio file set interface, the audio preview clip of the at least one audio file in the target audio file set, the method further comprises:

calling, on the target audio file set interface, a player to play each audio file in the target audio file set in response to a playing request of playing the target audio file set after completing previewing.

11. The method according to claim 1, wherein after playing, on the target audio file set interface, the audio preview clip of the at least one audio file in the target audio file set, the method further comprises:

replaying, on the target audio file set interface, the audio preview clip of the at least one audio file in response to a retrying request of repreviewing the target audio file set after completing previewing.

12. The method according to claim 1, wherein the information further comprises a singer.

13. The method according to claim 1, wherein before playing, on the target audio file set interface, the audio preview clip of the at least one audio file in the target audio file set, the method further comprises:

determining the audio preview clip of the at least one audio file in the target audio file set, wherein the audio preview clip of the at least one audio file is a characteristic audio clip in the at least one audio file.

14. A non-transitory computer-readable storage medium, wherein the computer-readable storage medium stores a computer program, and the computer program enables a server to execute the method according to claim 1.

15. An audio previewing apparatus, comprising:

a processor;

a memory; and a computer program;

wherein the computer program is stored in the memory and is configured to be executed by the processor to enable the processor to:

play, on a target audio file set interface, an audio preview clip of at least one audio file in a target audio file set in response to a previewing request of previewing the target audio file set, wherein the target audio file set interface is a previewing interface for previewing the target audio file set; and display, on the target audio file set interface, information of an audio file corresponding to an audio preview clip that is currently played;

wherein the processor is further enabled to:

determine a progress bar corresponding to the audio preview clip of the at least one audio file; and display the progress bar on the target audio file set interface, wherein the progress bar represents a play progress of the audio preview clip of the at least one audio file, wherein the progress bar comprises multiple segments, and each segment of the multiple segments corresponds to an audio preview clip of one audio file in the at least one audio file, and wherein a part of the progress bar which corresponds to a played part of the audio preview clip of the at least one audio file, and a part of the progress bar which corresponds to an unplayed part of the audio preview clip of the at least one audio file are displayed differently, wherein the processor is further enabled to:

switch to an audio file set detailed interface from the target audio file set interface in response to an entering request of entering the audio file set detailed interface of the target audio file set after completing previewing, wherein the audio file set detailed interface comprises the information of each audio file in the target audio file set, wherein the information comprises a name.

16. The apparatus according to claim 15, wherein the processor is further enabled to:

switch, on the target audio file set interface, the audio preview clip that is currently played in response to a switching request of switching the audio preview clip that is currently played, and play a switched audio preview clip.

17. The apparatus according to claim 15, wherein the target audio file set interface comprises the information of each audio file in the at least one audio file; and the processor is further enabled to:

highlight and display, on the target audio file set interface, the information of the audio file corresponding to the audio preview clip that is currently played.

\* \* \* \* \*